(12) United States Patent
Nakayama (10) Patent No.: US 7,070,487 B2
(45) Date of Patent: Jul. 4, 2006

(54) WASHING DEVICE (75) Inventor: Akinori Nakayama, Kashiwa (JP)

(73) Assignee: Nissanki Co., Ltd., Kashiwa (JP)

(*) Notice: Subject to any disclaimer, the term of this patent is extended or adjusted under 35 U.S.C. 154(b) by 0 days.

(21) Appl. No.: 10/394,292

(22) Filed: Mar. 20, 2003

(65) Prior Publication Data
US 2004/0185757 A1  Sep. 23, 2004

(51) Int. Cl.
B24C 3/30 (2006.01)
B24C 7/00 (2006.01)
(52) U.S. Cl. .......................... 451/86; 451/88
(58) Field of Classification Search ............... 451/86, 451/87, 88, 75, 89, 95, 96, 38, 39, 40
See application file for complete search history.

(56) References Cited
U.S. PATENT DOCUMENTS 2,632,980 A * 3/1953 Ransohoff .................. 451/38
3,553,895 A * 1/1971 Power ...................... 451/87
3,824,739 A * 7/1974 Moret et al. ............... 451/81
4,374,443 A * 2/1983 Mosell ........................ 15/3
5,203,124 A * 4/1993 Carpenter .................. 451/75
5,245,798 A * 9/1993 Carpenter .................. 451/86
5,637,029 A * 6/1997 Lehane ...................... 451/39

FOREIGN PATENT DOCUMENTS
JP         46-31275      *  9/1971  ............... 451/88

* cited by examiner

Primary Examiner—Robert A. Rose
(74) Attorney, Agent, or Firm—Jordan and Hamburg, LLP (57) ABSTRACT A washing device includes a case body; a table installed into the case body for supporting a workpiece which is to be cleaned; an solid cleaning substance feeding device having an impeller, capable of projecting an solid cleaning substance and a cleaning liquid to the work; an solid cleaning substance supply which supplies the solid cleaning substance to the solid cleaning substance feeding device by driving the impeller; and a cleaning liquid supply which supplies the cleaning liquid to the impeller when the solid cleaning substance feeding device drives so that it can remove paint, a mold release agent, dirt, oil dirt, etc. in a short time and can be used again and again. The device can use a cleaning agent, such as a surface-active agent, an antirust agent, a degreasing agent, warm water, water, and prevents pollution of the environment, the human body, and the subsoil.

3 Claims, 9 Drawing Sheets

WASHING DEVICE

BACKGROUND OF THE INVENTION

This invention relates to a washing device used for removal of non-dried paint from a paint jig to which the non-dried paint is adhered, removal of a mold release agent of a metallic mold, removal of dirt and debris from building materials, removal of oil and dirt from machining, etc.

The conventional paint jig to which non-dried paint has adhered is reusable after substances such as lacquer thinner, chlorinated solvent and water-soluble detergent are removed by spray and dip methods.

In the way that the lacquer thinner, chlorinated solvent and water-soluble detergent are removed by a spray and a dip methods, it takes much time and by re-use, the mass-production processing is not performed when many paint jigs were not prepared.

Moreover, the lacquer thinner, a chlorinated solvent and a water-soluble detergent cause to pollution to environment, human body, and underground.

SUMMARY OF THE INVENTION

In light of the forgoing, it is an object of the invention to provide a washing device which removes paint, a mold release agent, dirt, oil dirt, etc. in a short time and can be used repeatedly. It is another object of the invention to provide a washing device which uses a cleaning agent such as a surface-active agent, an antirust agent, a degreasing agent, warm water, water, and the like and prevents pollution of the environment, exposure of humans to pollution, and contamination of the subsoil and underground water.

Novel features which are characteristic of the invention, both as to its organization and method of operation, together with further objects and advantages thereof, are described below with reference to the accompanying drawings in which preferred embodiments of the invention are illustrated as an example.

It is to be expressly understood, however, that the drawings are for the purpose of illustration and description only, and are not intended as a definition of the limits of the invention.

BRIEF DESCRIPTION OF THE

DETAILED DESCRIPTION OF THE PREFERRED EMBODIMENTS

Preferred embodiments of the present invention are described in more detail below with reference to the accompanying drawings. An understanding of the present invention may be best gained by reference to FIGS. 1–5. FIGS. 1–5 illustrate a washing device in accordance with a first embodiment of the present invention.

Reference numeral 1 shows a washing device which is used for removal of the non-dried paint of a paint jig to which the non-dried paint has adhered, removal of the mold release agent of a metallic mold, removal of dirt and debris of building material, removal of the oil and dirt from machining, and the like. The washing device 1 includes a case body 4 having doors 2, 3, capable of being opened and closed, provided at upper and lower parts of a front surface thereof; a table 6 provided at a center portion within the case body 4, and formed in the shape of a madreporic (perforated) plate, which supports a workpiece to be 5 cleaned; a solid cleaning substance feeding device 11 having an impeller 10 which is driven by a motor 9; solid cleaning substance supply 14; a cleaning liquid supply 18; a hopper 19 installed in the case body 4, and placed at a lower portion below the table 6, for introducing 7 and a cleaning liquid 8 onto the workpiece 5; and a selecting device 23 having an exciter 22.

The solid cleaning substance feeding device 11 sprays the solid cleaning substance 7, made of a synthetic resin, metallic material or the like, and the cleaning liquid 8, including a surface active agent, an antirust agent, a degreasing agent, warm water, or water or the like onto the workpiece 5.

The solid cleaning substance supply 14 further includes a tank 12, which supplies the solid cleaning substance 7 to the solid cleaning substance feeding device 11 by driving the impeller 10 and a suction hose 13 which supplies the solid cleaning substance 7 into the tank 12.

The cleaning liquid supply 18 further includes a cleaning liquid tank 15 which supplies the cleaning liquid 8 to the impeller 10 when the solid cleaning substance device 11 operates; and a cleaning liquid supply hose 17. The cleaning liquid supply hose 17 line includes a pump 16 which supplies the cleaning liquid 8 from the cleaning liquid tank 15 to the impeller 10.

The exciter 22 of the selecting device 23 is installed into the case body 4 and introduces the cleaning liquid 8 into the cleaning liquid tank 15; the incidence object 7 into the tank 12; and dust and debris 20, such as weld flash and garbage removed by washing into a debris container 21.

In the washing device 1, after the upper opening and shutting doors 2 of the case body 4 is opened, the workpiece 5 which it is going to be washed is supported on the table 6. Then the upper opening and shutting door 2 is closed.

In this state, after the motor 9 of the solid cleaning substance feeding device 11, the exciter 22 of the selecting device 23 and the pump 16 of washing liquid supply equipment 18 are driven, the impeller 10 of the solid cleaning substance feeding device 11 rotates, the solid cleaning substance feeding object 7 within the tank 12 is attracted through the suction hose 13, and the solid cleaning substance feeding object 7 is projected onto the work 5 on a table 6. Moreover, the washing liquid 8 is supplied to the impeller 10 through the washing liquid supply hose 17 with a pump 16, it is incident from the impeller 10 to the work 5, and incidence with the solid cleaning substance feeding object 7 and washing liquid 8 can wash the work 5 efficiently.

The solid cleaning substance feeding object 7 and the washing liquid 8 which were projected to the work 5 fall from the table 6 to the hopper 19 and are supplied to the selecting device 23. After that, the solid cleaning substance feeding object 7, the washing liquid 8 and the dust 20 are automatically sorted are discharged by vibration of the exciter 22 of the selecting device 23 to the incidence object tank 12, the washing liquid tank 15 and the dust receipt container 21 respectively.

After the work 5 is washed, the drive of the motor 9 of the incidence device 11, the exciter 22 of the selecting device 23 and the pump 16 of the washing liquid supply equipment 18 are stopped, and the work 5 which is washed completely on the table 6 is taken out after the upper opening and shutting door 2 is opened.

Such work is repeated successively and washing of the work 5 is performed.

In addition, the incidence object 7 and washing liquid 8 may be used alternatively so as to adjust the kind and the washing purpose of the work 5.

Moreover, it can grind simultaneously with washing by using the incidence object 7 which is mixed or thrown object that can grind metal etc.

Other embodiments of the present invention will now be described with reference to FIGS. 6–9. In FIGS. 6–9, the same components as in the first embodiment described above with reference to FIGS. 6–9 are designated by the same reference numerals and therefore will not be further explained in great detail.

Figure 1:
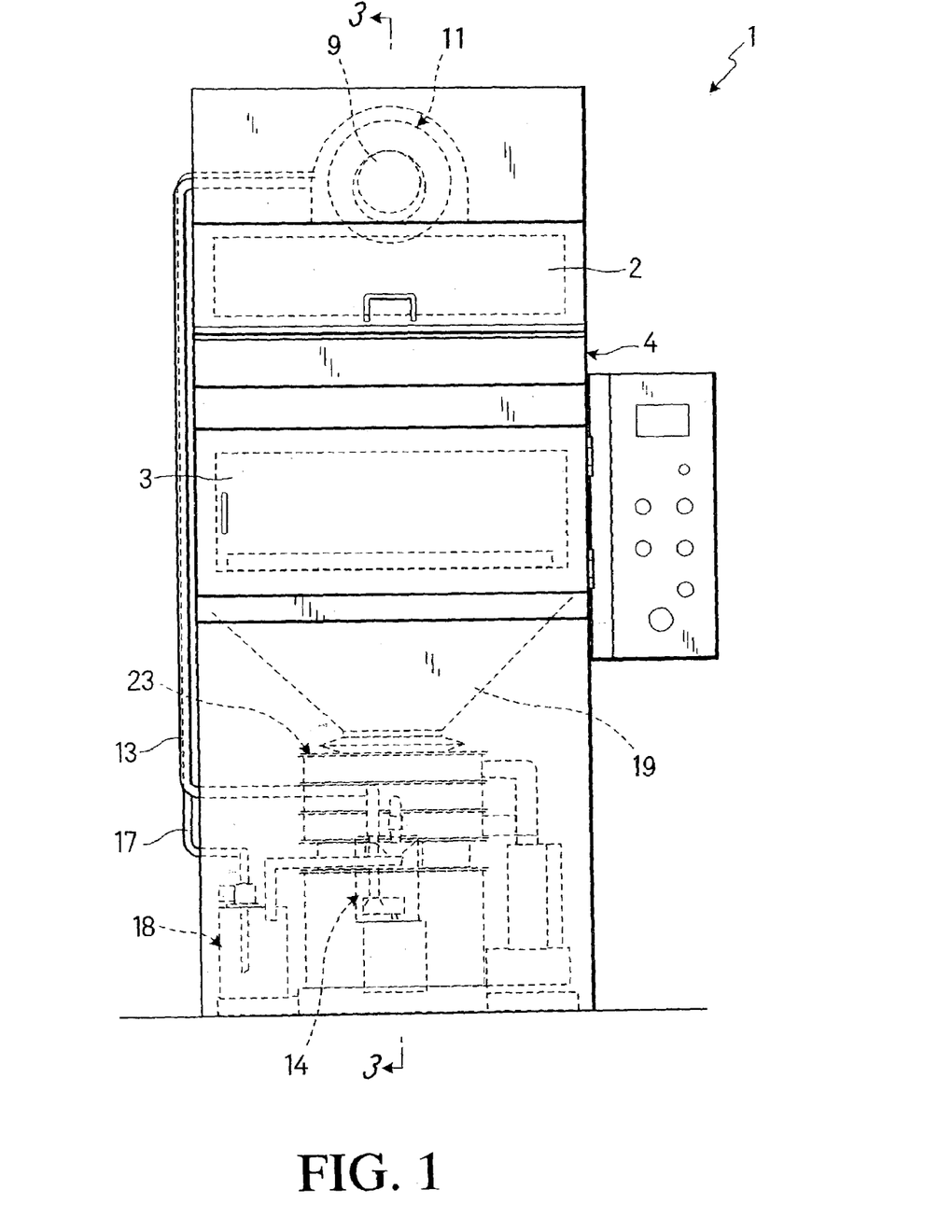
FIG. 1 is a front view showing a first embodiment of the present invention.
Figure 2:
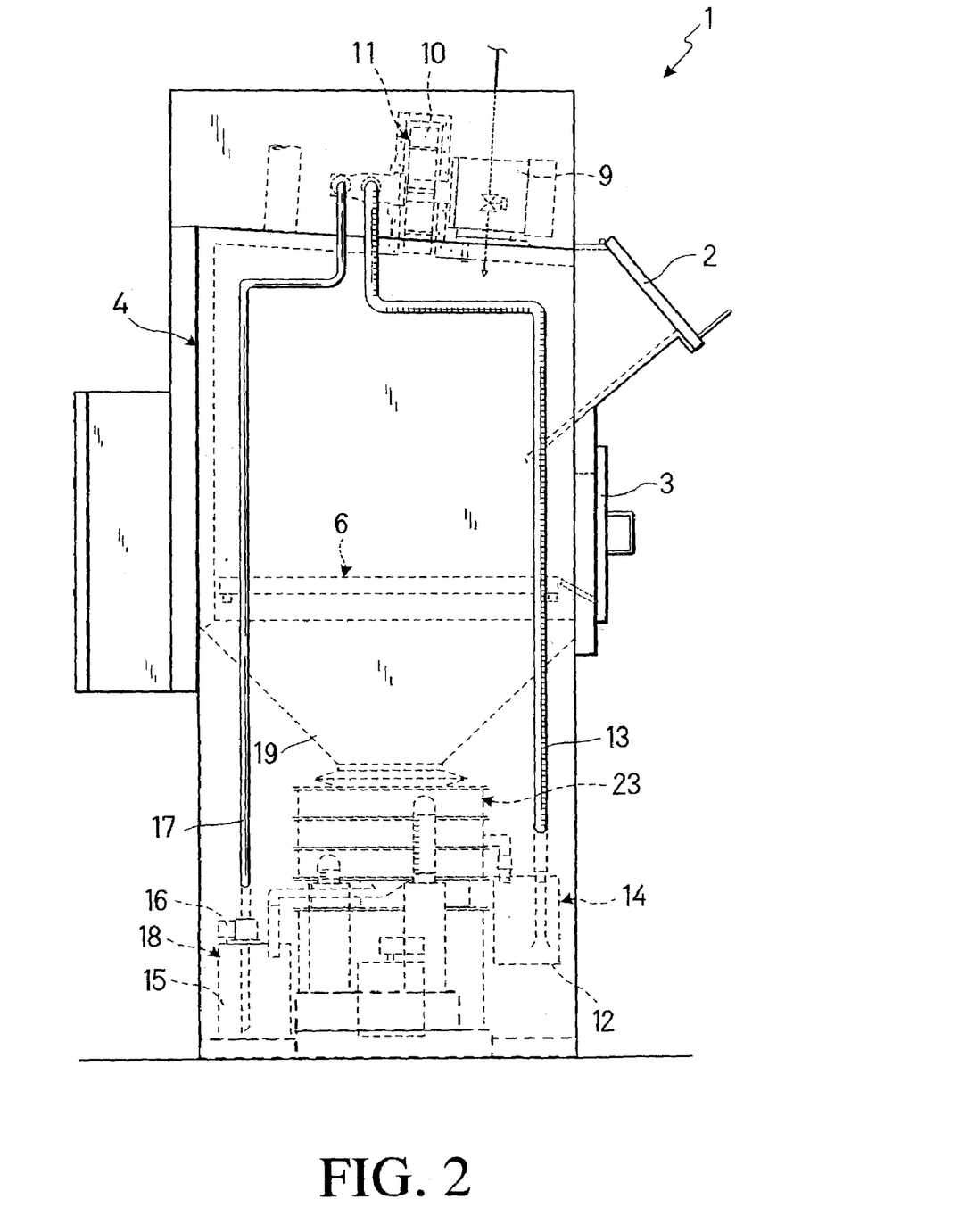
FIG. 2 is a side view showing a first embodiment of the present invention.
Figure 3:
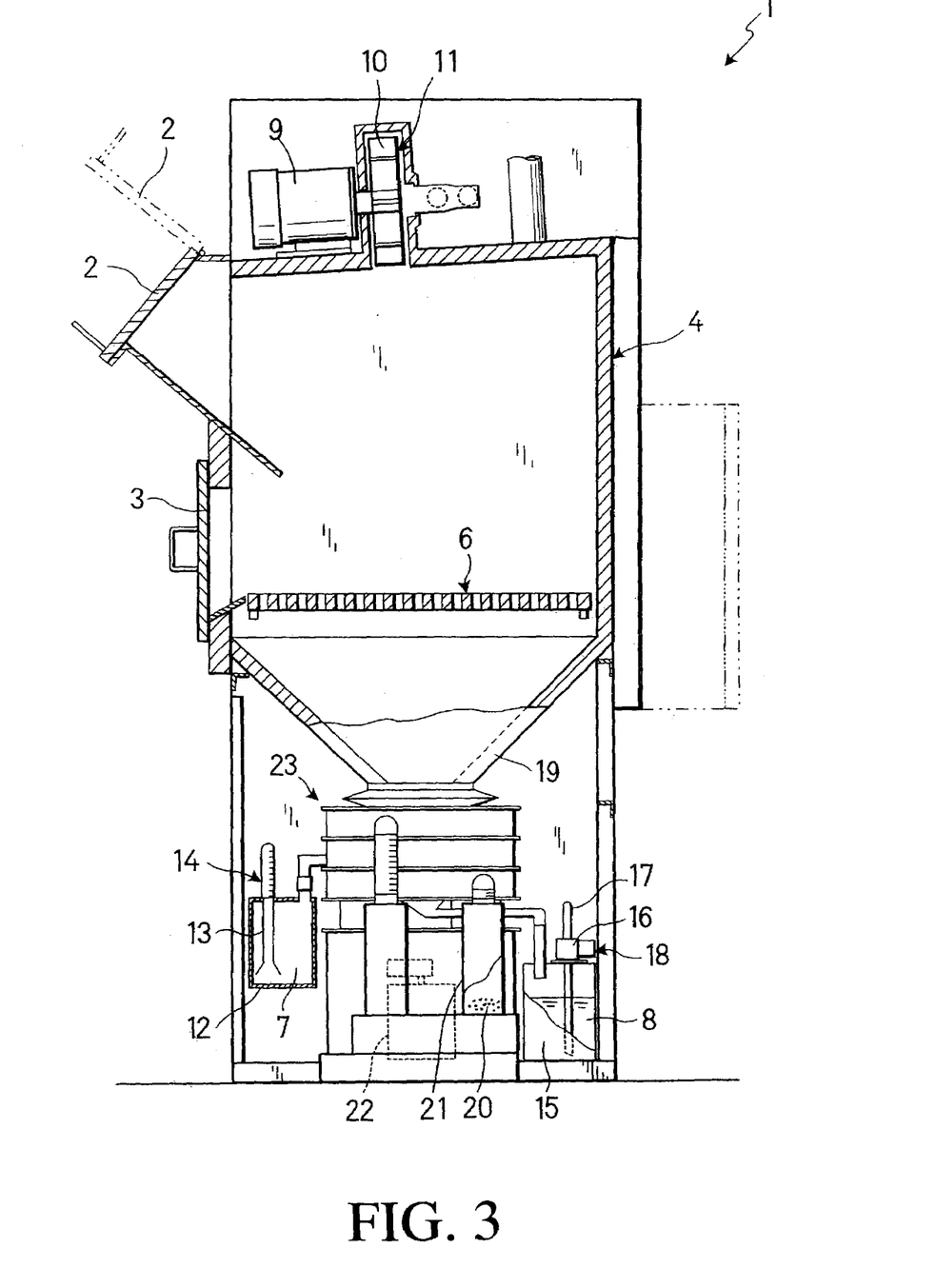
FIG. 3 is a cross sectional view taken along a line 3—3 of FIG. 1.
Figure 4:
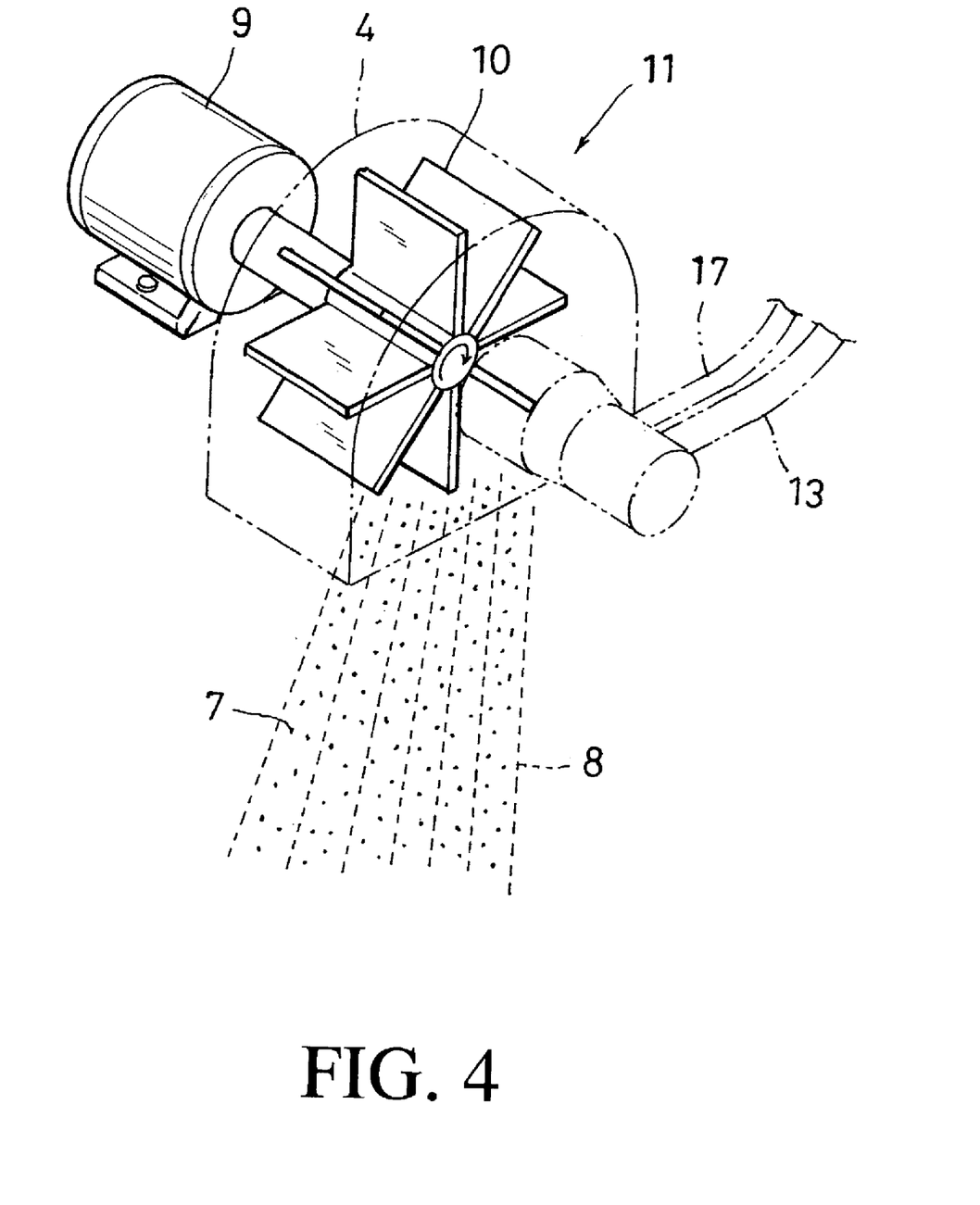
FIG. 4 is an explanation view of an incidence device.
Figure 5:
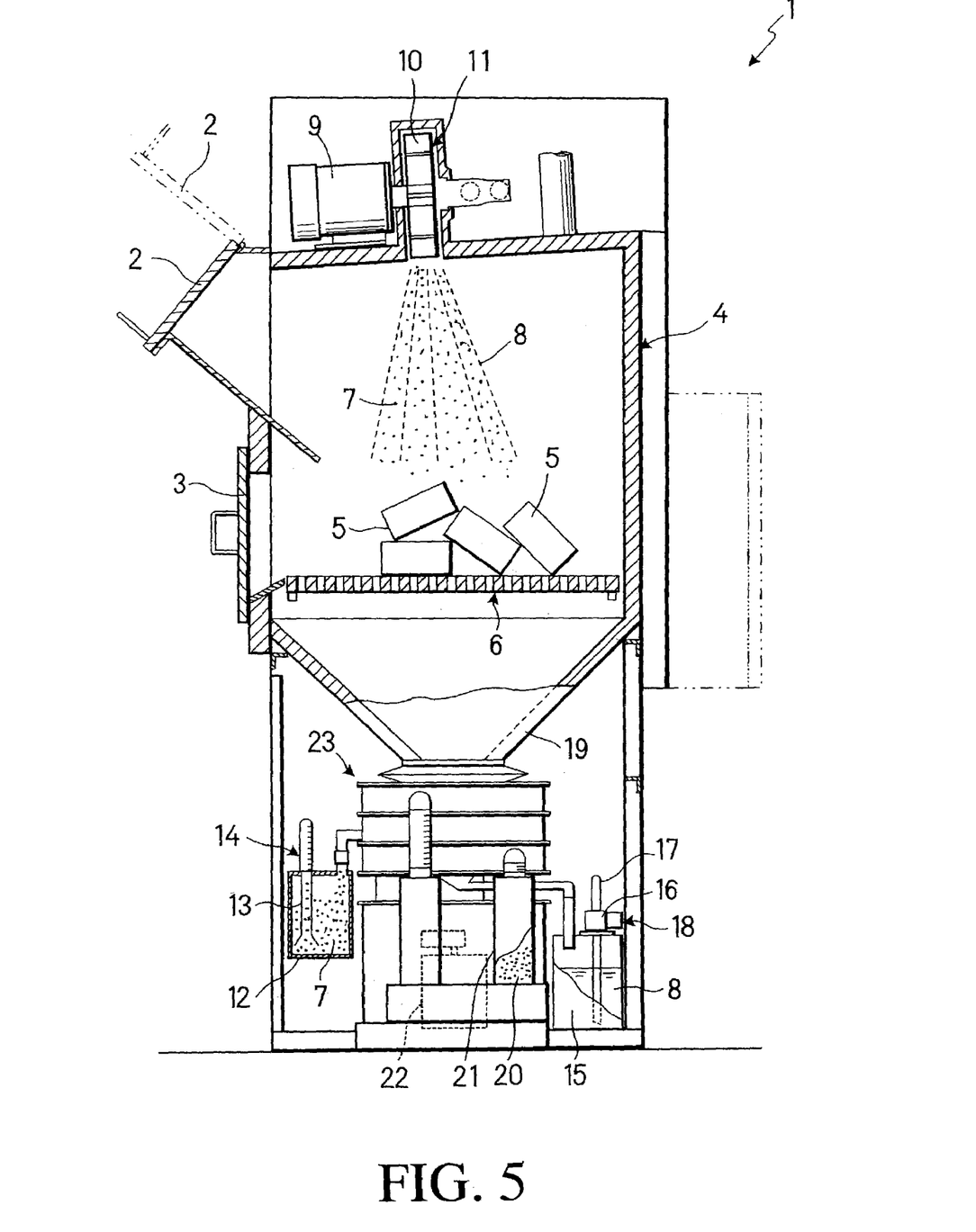
FIG. 5 is a view when in use
Figure 6:
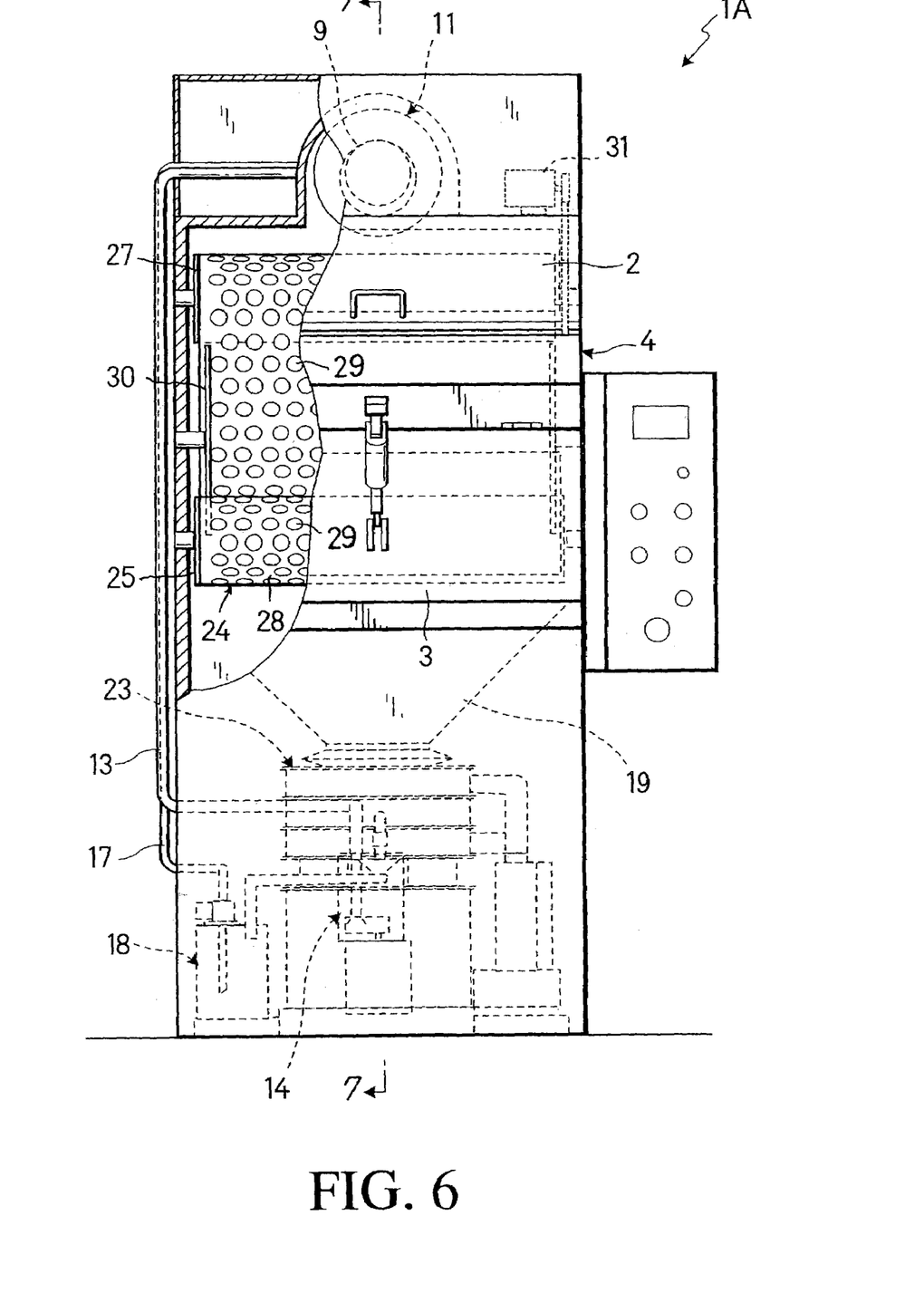
FIG. 6 is a front view showing a second embodiment of the present invention.
Figure 7:
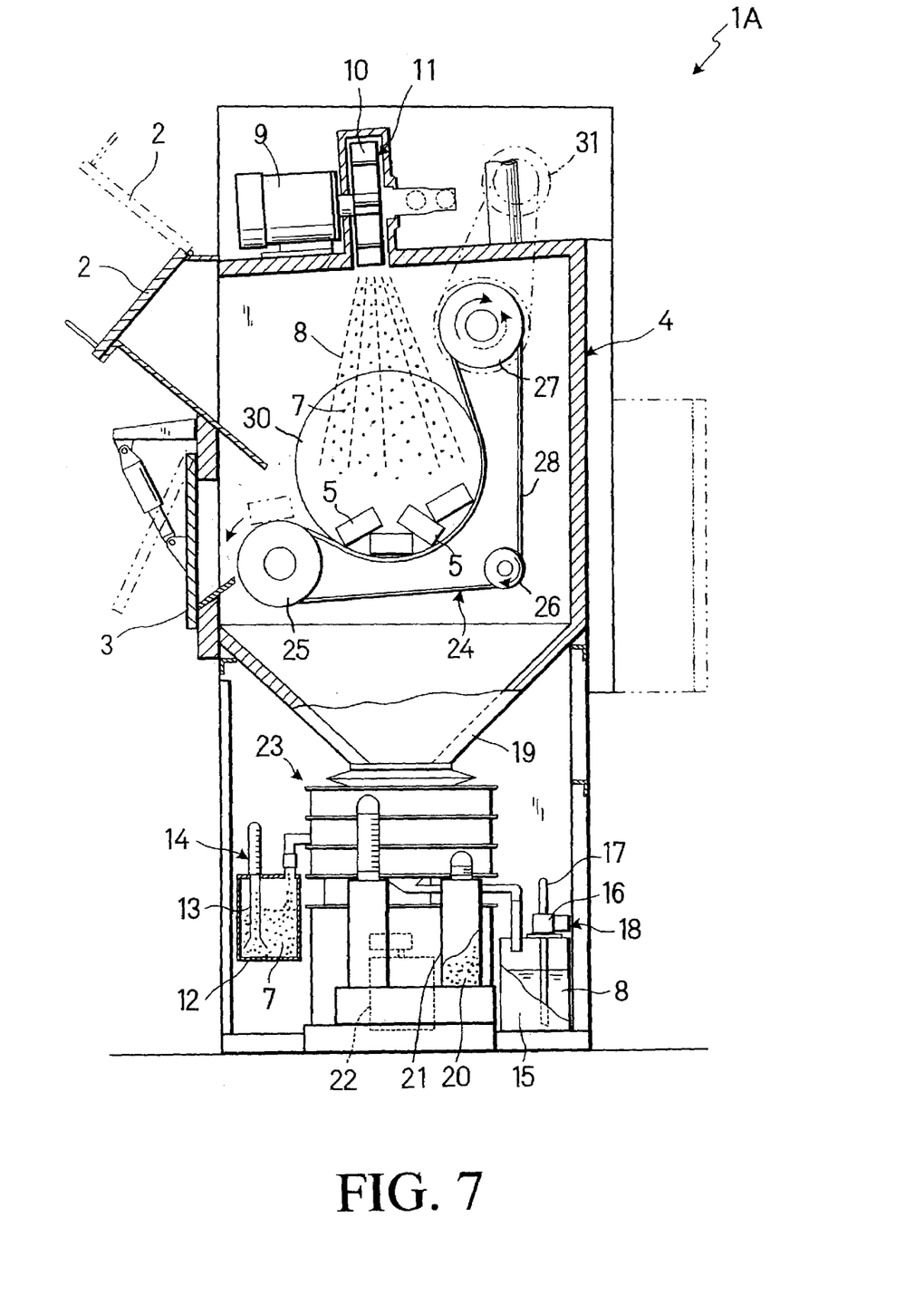
FIG. 7 is a cross sectional view taken along a line 7—7 of FIG. 6.

A second embodiment of the present invention is shown in FIGS. 6 and 7. It is distinguished from the first embodiment in that the conveyor belt 24 which is formed in the shape of a L-letter is used and it can be agitated while supporting the work 5. A washing device 1A with the conveyer 24 according to the second embodiment has similar advantages to that according to the first embodiment.

In addition, the numerals 25, 26 and 27 shows rotation axles attached to a front portion, back portion and upper part of the back portion of a part adjacent the lower part of an opening of the upper opening and shutting doors 2. The numeral 28 shows a belt provided at the rotation axles 25, 26 and 27 so as to form in the shape of a L-letter. A guide roller 30, having a plurality of through holes 29, presses both ends of the belt 28 positioned between the rotation axles 25 and 27. A reversible motor is attached to the case body 4 and drives the rotation axle 27.

Figure 8:
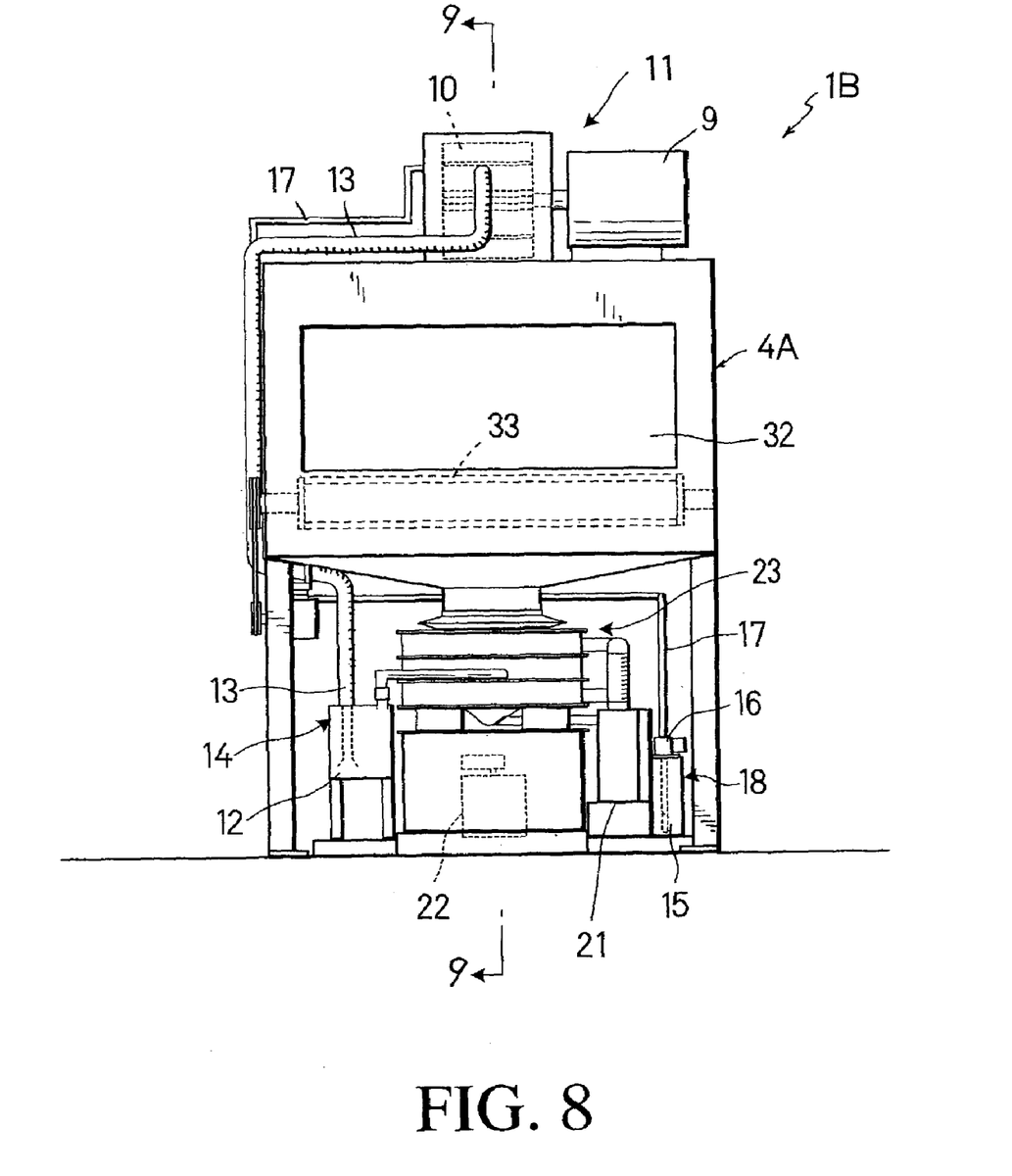
FIG. 8 is a front view showing a third embodiment of the present invention.
Figure 9:
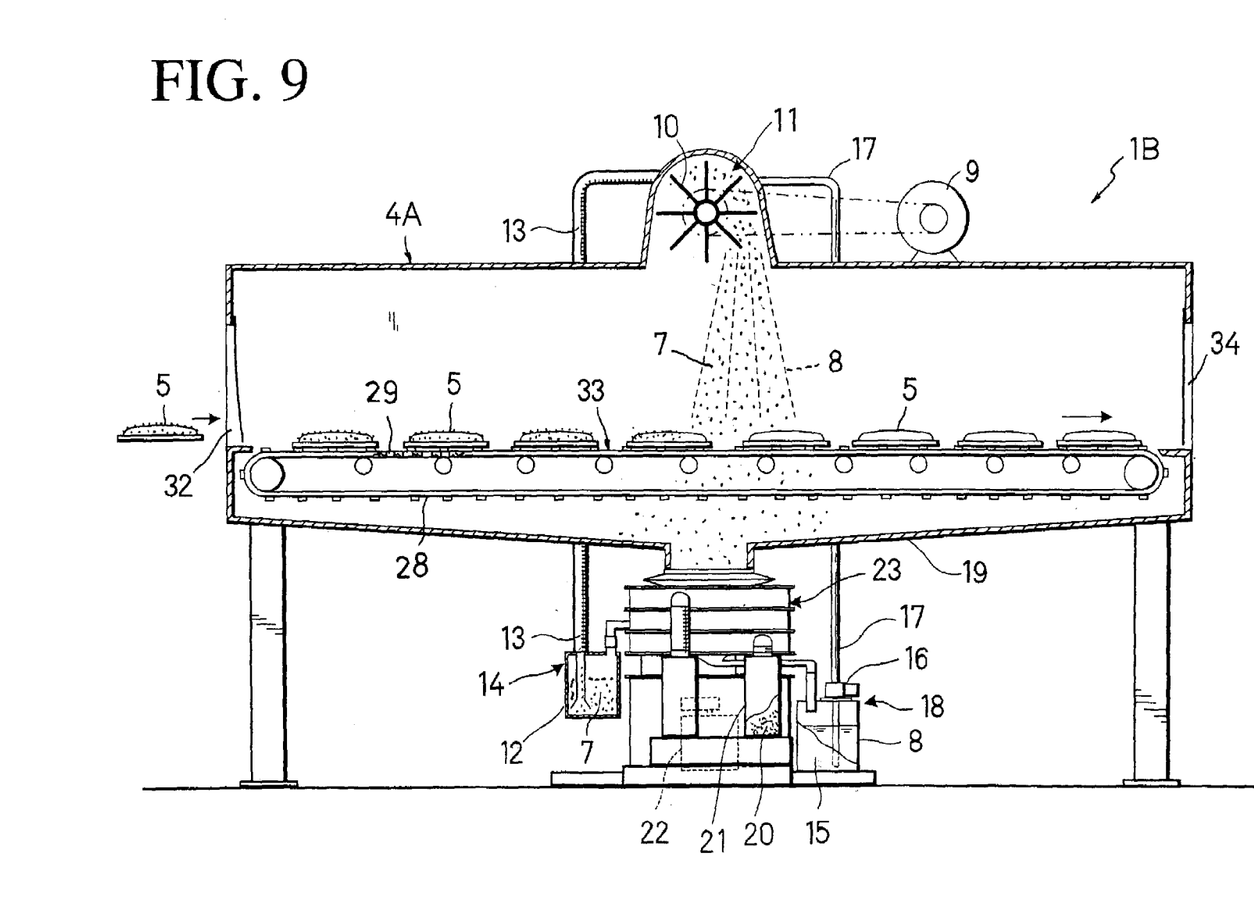
FIG. 9 is a cross sectional view taken along a line 9—9 of FIG. 8.

A third embodiment of the present invention is shown in FIGS. 8 and 9. It is distinguished from the first embodiment in that a conveyor belt 33 includes a belt 28 having a plurality of through holes 29, and the work 5 is discharged from an entrance slot 32 of a case body 4A to an outlet 34 on the back thereof by the conveyor belt 33. A washing device 1B that the incidence object 7 and the washing liquid 8 is incident to the work 5, and it is washed during it is carried by conveyor belt 33 according to the second embodiment has similar advantages to that according to the first embodiment.

As set forth above, the advantages of the invention are as follows:

(1) A washing device includes a case body; a table installed into the case body and supports a work 5 which is cleaned; an incidence device having a impeller 10, capable of projecting an incidence object and a cleaning liquid to the work 5; an solid cleaning substance supply which supplies the incidence object to the solid cleaning substance feeding device by driving the impeller 10; and a cleaning liquid supply which supplies the cleaning liquid to the impeller 10 when the solid cleaning substance feeding device drives so that the work 5 can be washed efficiently by the projection of the solid cleaning substance and the washing liquid.

Therefore, it can wash in a short time.

(2) As discussed above, a solid cleaning substance feeding device, the solid cleaning substance and washing liquid can be projected on the work 5 by the rotation of the impeller 10.

Therefore, projection of the solid cleaning substance and washing liquid can be performed easily.

(3) As discussed above, since the washing liquid is just supplied to the impeller 10, a compressor and high-pressure pump is also unnecessary, and the simplification and labor-saving of equipment can be attained.

(4) As discussed above, it can use cleaning agent such as surface-active agent, antirust, a degreasing agent, warm water, water, etc.

Therefore, it can prevent pollution of the environment, the human body, and the subsoil by the lacquer thinner, a chlorinated solvent and a water-soluble detergent.

What is claimed is:

1. A washing device for the removal of at least one of particulate matter and chemical substances from a surface of a workpiece being cleaned, said washing device comprising:
   a case body having a plurality of alternatively openable and closeable doors on a front surface of said case body through which an interior of said case body is accessible;
   a perforated plate table stationary and fixedly mounted in said interior of said case body for supporting at least one workpiece which is to be cleaned;
   a solid cleaning substance feeding device having an impeller, for projecting a solid cleaning substance and a cleaning liquid downwardly onto said at least one workpiece;
   a solid cleaning substance supply for supplying said solid cleaning substance from a first container to said solid cleaning substance feeding device by driving said impeller;
   a cleaning liquid supply for supplying said cleaning liquid from a second container to said impeller when said solid cleaning substance feeding device operates; and
   a sorting device for receiving a mixture of spent solid cleaning substance, spent cleaning liquid, and particulate matter removed from said surface of said workpiece after said mixture has been collected from said table, and for vibrating said mixture thereby sorting said solid cleaning substance into said first container, said cleaning liquid supply fluid into said second container and the particulate matter into a third container.

2. A washing device comprising:
   a case body having a plurality of alternatively openable and closeable doors on a front surface of said case body through which an interior of said case body is accessible;
   a perforated plate table stationary and fixedly mounted in said interior of said case body for supporting at least one workpiece which is to cleaned;
   a solid cleaning substance feeding device having an impeller, for projecting a solid cleaning substance and a cleaning liquid onto said at least one workpiece to wash said at least one workpiece;
   a solid cleaning substance supply for supplying said solid cleaning substance from a first container to said solid cleaning substance feeding device by driving said impeller;

a cleaning liquid supply for supplying said cleaning liquid from a second container to said impeller when said solid cleaning substance feeding device operates;

a hopper, positioned in said interior of said case body below said table, for introducing said solid cleaning substance and said cleaning liquid downward onto said at least one workpiece; and a sorting device in said interior of said case body, for vibrating a mixture of said solid cleaning substance, said cleaning liquid and weld flash, dirt and debris removed by said solid cleaning substance and said cleaning liquid during washing thereby sorting said solid cleaning substance into said first container, said cleaning liquid supply fluid into said second container and the weld flash, dirt and debris into a third container.

3. A washing device comprising:

a case body having a plurality of alternatively openable and closeable doors on a front surface of said case body through which an interior of said case body is accessible;

a conveyor belt in said interior of said case body, formed as an endless belt having a plurality of through holes therein, and capable of movement while supporting at least one workpiece which is to be cleaned;

a solid cleaning substance feeding device having an impeller and capable of projecting a solid cleaning substance and a cleaning liquid onto said at least one workpiece supported by said conveyor belt;

a solid cleaning substance supply for supplying said solid cleaning substance from a first container to said solid cleaning substance feeding device by driving said impeller;

a cleaning liquid supply, which supplies said cleaning liquid from a second container to said impeller when said solid cleaning substance feeding device operates;

a hopper in said interior of said case body, for introducing said solid cleaning substance and said cleaning liquid downwardly onto said workpiece; and a sorting device in said interior of said case body, for vibrating a mixture of said solid cleaning substance, said cleaning liquid and weld flash, dirt and debris removed from said workpiece by said solid cleaning substance and said cleaning liquid during washing thereby sorting said solid cleaning substance into said first container, said cleaning supply fluid into said second container and the weld flash, dirt and debris into a third container.

* * * * *